(12) United States Patent
Clement et al.

(10) Patent No.: US 8,477,914 B1
(45) Date of Patent: Jul. 2, 2013

(54) AUTOMATED COMMUNICATION ESCALATION

(75) Inventors: Dallas Stephen Clement, Atlanta, GA (US); Douglas David Gravino, Roswell, GA (US); Michael Lee Poffenberger, Atlanta, GA (US); Lalit Tulsidas Bhatia, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 157 days.

(21) Appl. No.: 13/081,807

(22) Filed: Apr. 7, 2011

Related U.S. Application Data

(60) Provisional application No. 61/420,113, filed on Dec. 6, 2010.

(51) Int. Cl.
*H04M 11/00* (2006.01)

(52) U.S. Cl.
USPC .......................................... 379/88.18; 379/37

(58) Field of Classification Search
USPC .................................. 379/88.08, 37; 709/206
See application file for complete search history.

(56) References Cited

U.S. PATENT DOCUMENTS 7,627,092 B2 * 12/2009 Contractor ...................... 379/45
2006/0010218 A1 * 1/2006 Turcotte ........................ 709/206

* cited by examiner

*Primary Examiner* — Creighton Smith
(74) *Attorney, Agent, or Firm* — Merchant & Gould

(57) ABSTRACT

Allowing an initiating party to invoke automated communication attempts that continue and escalate and limit a targeted party's wireless device capabilities until satisfactory communication is established with the targeted party is provided. After a number of unsuccessful attempts at communicating with the targeted party, the initiating party may activate an automated escalating communication system that encourages the targeted party to eventually respond due to escalating communications automatically sent to the targeted party or his/her affiliates or due to limiting controls placed on the targeted party's communication device.

21 Claims, 7 Drawing Sheets

AUTOMATED COMMUNICATION ESCALATION

CROSS REFERENCE TO RELATED APPLICATIONS

The present application claims priority to U.S. Provisional Patent Application No. 61/420,113 filed Dec. 6, 2010, the disclosure of which is hereby incorporated by reference in its entirety.

BACKGROUND

Wireless communication devices are used extensively by a variety of users, from business persons to children. In some cases, a supervising person (e.g., business owner/manager or parent, etc.) may attempt to communicate with a user of a wireless communication device (e.g., employee or child), and the targeted user of the device may not respond accordingly.

Current automated communication system applications may initiate communication attempts with a user of a wireless communication device via SMS (Short Message Service), MMS (Multi Media Service), Email (Electronic Mail), phone call, etc. Some applications may allow this communication attempt to be repeated automatically after a period of time. Current methods used by an initiating party to communicate with a targeted party may be to send a message using one of the aforementioned methods and wait for a response.

While these systems provide some useful methods for establishing communication with a targeted party, current methods to encourage the targeted party to respond are limited and do not provide a means for communication attempts to be automatically escalated and, if desired, to invoke limitations on the use of the targeted party's wireless communication device to compel the targeted party to respond to an initiating party. It is with respect to these and other considerations that the present invention has been made.

SUMMARY

Consistent with embodiments of the present invention, systems and methods are disclosed for allowing an initiating party to invoke automated communication attempts that continue and escalate and limit the targeted party's wireless communication device capabilities until satisfactory communication is established with the targeted party. It should be appreciated that an initiating party may be a parent, work supervisor, or other authority-type figure who may have certain privileges over a targeted party's communication device. According to an embodiment, after a number of unsuccessful attempts at communicating with the targeted party, the initiating party may activate an automated escalating communication system that encourages the targeted party to eventually respond due to limiting controls placed on the targeted party's wireless communication device.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1A:
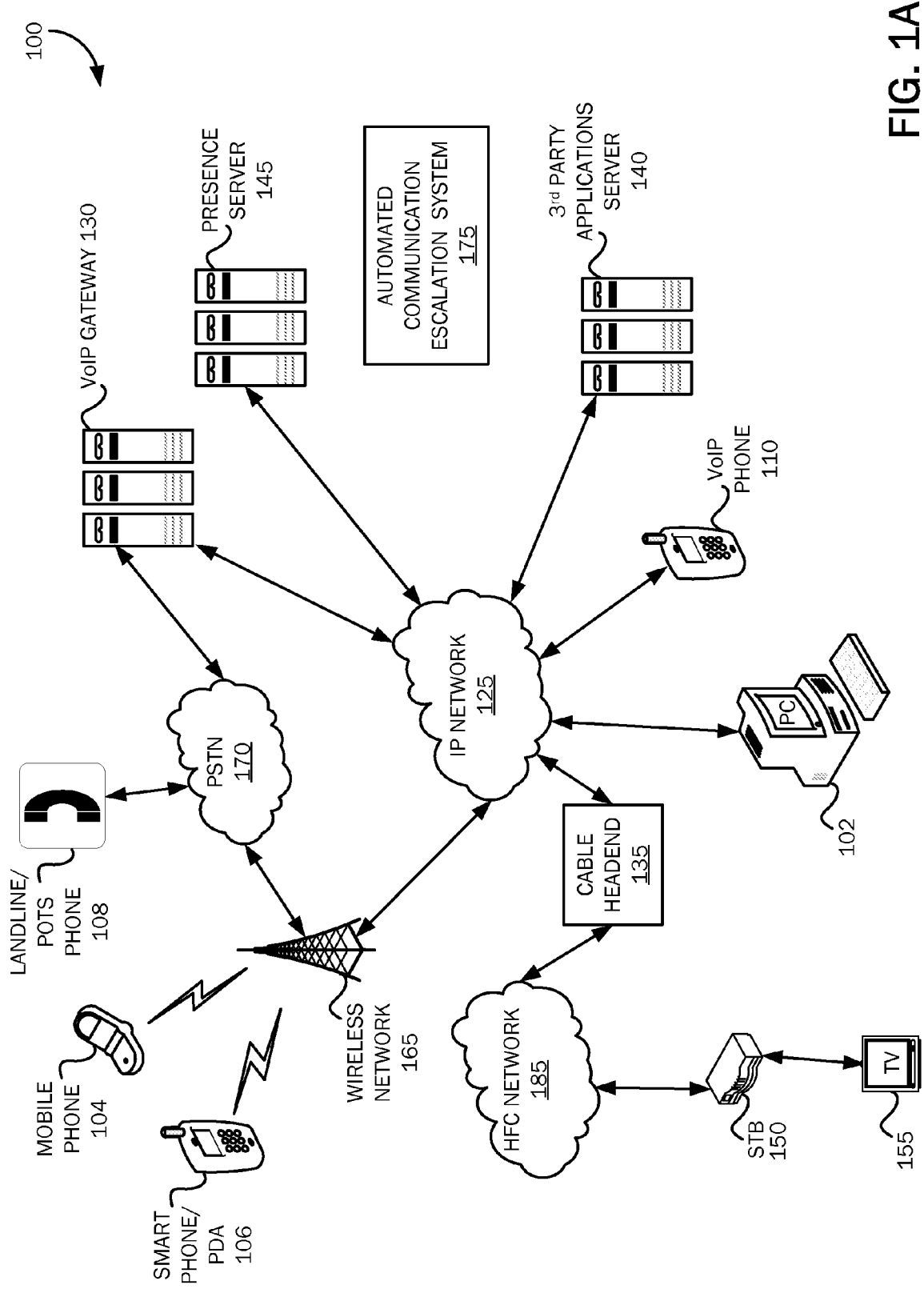
FIG. 1A is a simplified block diagram of a distributed communications network 100.

As briefly described above, embodiments of the present invention are directed to allowing an initiating party to establish communications with a targeted party using automated escalation of communications methods. As will be described below, according to embodiments, an initiating party (e.g., a business supervisor, parent, guardian, or the like) may provision an automated escalation feature on a wireless communication device so that the initiating party may encourage the targeted party to respond. This automated escalation method may invoke feature limiting controls on the targeted party's wireless communication device if the desired response is not received from the targeted party.

When attempts at communication are placed to a targeted wireless communication device without a desired response from the targeted party, an authorized initiating party may be authorized to begin an automated communication escalation method. For example, an initiating party may be a parent or guardian attempting to communicate with a child unwilling to respond. Attempts to communicate may be automatically repeated by a control center. After a specified number of attempts, the control center may then initiate attempts at communication with additional targeted parties. Other targeted parties may include, but are not limited to, manually entered contacts associated with the first targeted party, contacts from the first targeted party's address book, contacts with whom the first targeted party communicates with most often, or contacts that may be near the first targeted party as determined by presence information. Other attempts to communicate may occur through social networking sites such as Facebook, MySpace, and the like. If these methods fail, features on the targeted party's wireless communication device may be controlled by the initiating party. For example, feature limitation may include denying access to social networking sites or denying any access to the Internet from the wireless communication device.

Another example of feature limitation may include limiting the ability of the target wireless device to send or receive communications, except for communications with a predetermined party (e.g., the initiating party) specified in a control center database. If communication attempts are made from the targeted wireless communication device to parties other than those allowed, the communication attempts may be automatically directed to the initiating party.

As another example, automated communication escalation may be utilized within a business where it may be deemed appropriate to invoke feature control over an employee's wireless communication device. The initiating party may be an employer, manager, supervisor, or security monitor of the employee.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1A is a block diagram illustrating an architecture 100 that provides a system and method for allowing an initiating party to invoke automated escalating communications until a successful communication is established with a targeted party. According to an embodiment, an IP-based (Internet Protocol) architecture provides for a variety of end-point devices (e.g., personal computers 102, mobile phones 104, PDAs 106, digital phones, etc.) to communicate with one or more remote applications or other end-point devices via a distributed packet-switched network (e.g., Internet, WAN) 125.

As should be appreciated, numerous end-point devices may be utilized to send and/or receive calls and/or messages in various operating environments according to embodiments of the present invention, including but not limited to personal computers 102, server computers, wireline telephones 108, wireless telephones 104, digital phones, video phones, text messaging devices, VoIP phones 110, set-top boxes 150, personal digital assistants 106, handheld computing devices, and distributed computing environments that may include any of the above devices.

Wireless communication devices, such as a mobile phone 104, PDA 106, or other mobile computing devices may be connected to a wireless voice and data network 165. A wireless network may connect to a public switched telephone network (PSTN) 170 and/or may connect to a packet-switched network (Internet) 125 via a wireless network gateway. Plain old telephone system (POTS) and landline telephones 108 may connect to a wireless network 165 via a public switched telephone network (PSTN) 170. A VoIP network gateway 130 may serve as a translator between a PSTN 170 and IP networks 125. Dedicated VoIP phones 110 allow VoIP calls without the use of a computer 102. A VoIP phone 110 may connect directly to an IP network 125 to communicate with other endpoints. Personal computers 102 may connect to an IP network 125 for various communications, such as voice, e-mail, messaging, faxing, etc. As should be appreciated, transmission technologies for delivery of voice and/or data communications over IP networks such as the Internet or other packet-switched networks is a known technology to those skilled in the art and will not be discussed in extensive detail herein.

Recently, cable set-top boxes (STB) 150 have become more than a device in which to receive digital television, but may be used to provide a variety of services, including but not limited to, telephone services, high-speed Internet access, Video on Demand (VOD), and information services. A STB 150 may function to receive stream of IP packets that may carry video, voice, and/or data information for display on a connected television set 155.

According to an embodiment of the present invention, a presence server 145 may be connected to an IP network 100 and may be utilized to receive current presence and availability data of a contact. A contact's presence information may be shared with others who may wish to know the availability or willingness of the contact to communicate. A presence server 145 may be operable to receive presence information of multiple devices of a user. This functionality is referred to as multiple points of presence (MPOP). A presence server 145 may track the presence of a targeted party's computer 102, mobile phone 104, PDA 106, landline/POTS phone 108, STB 150, etc.

According to an embodiment, an automated communication escalation system 175 is a software application module operative to provide automated escalated communications to a targeted communication device. Automated communication escalation system 175 may be located locally on a user's communication device, may be located within a service provider network, or may be located in a remote server and accessed via components of the distributed communications network 100. According to an embodiment, automated communication escalation system 175 may comprise a set of application programming interfaces (API) exposed to applications and operating systems that allow communication between applications and operating systems through common data calls understood via the API set.

Figure 1B:
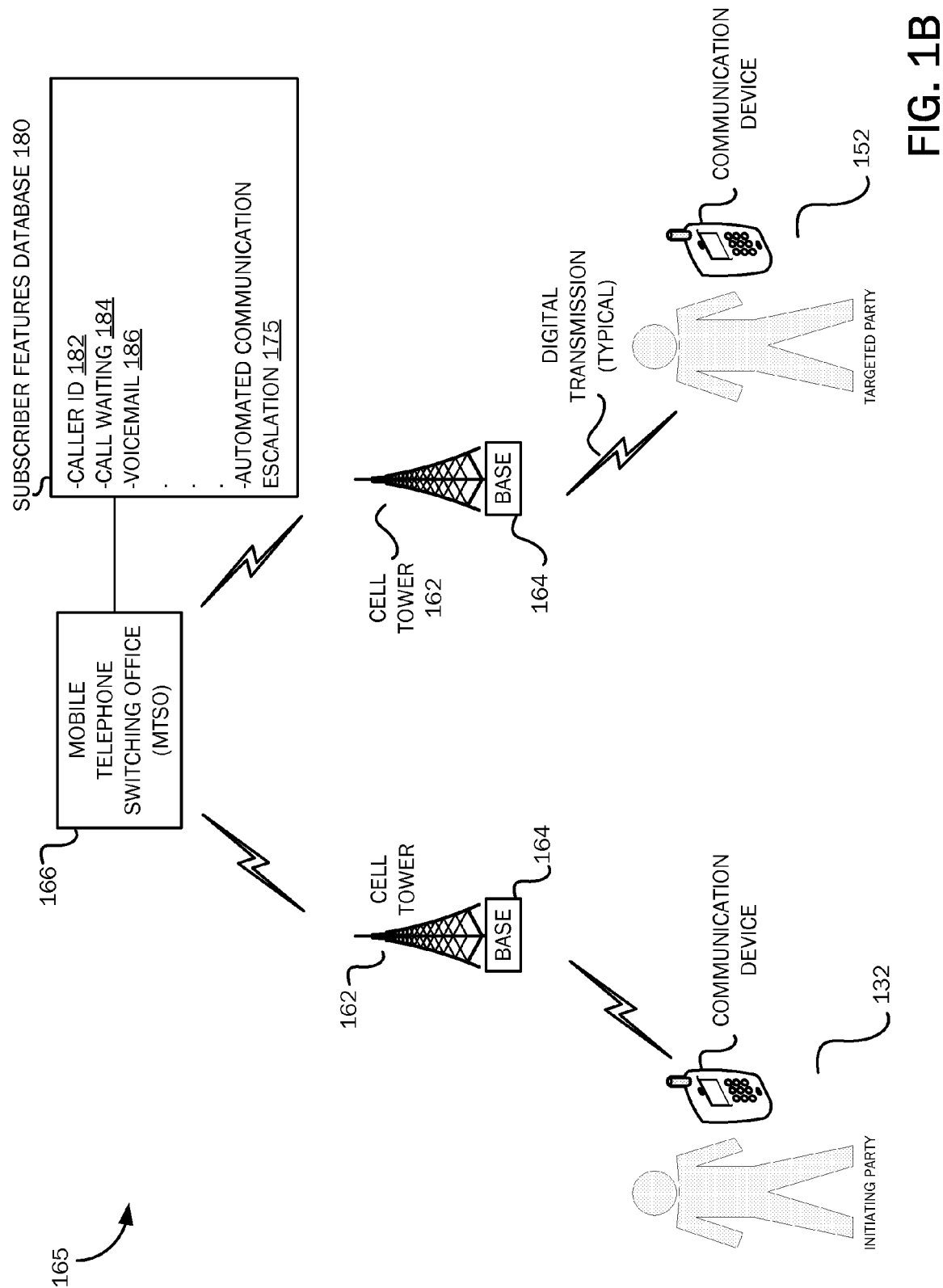
FIG. 1B is a simplified block diagram illustrating a wireless communications network architecture that serves as an exemplary operating environment for the present invention.

Having described elements of an architecture 100 in which embodiments of the invention may be practiced, FIG. 1B is a simplified block diagram illustrating a wireless communications network architecture that serves as an example exemplary operating environment for the present invention. As should be understood, the example wireless communications network architecture 165 illustrated in FIG. 1B is for purposes of example and is not limiting of a variety of communications configurations that may be utilized as described herein. Referring now to FIG. 1B, wireless communication services are provided by various service provider companies through a wireless network 165. As is known to those skilled in the art, wireless networks 165 may consist of but not be limited to cellular towers 162, base stations 164, and a Mobile Telephone Switching Office (hereafter referred to as "MTSO") 166.

As is known to those skilled in the art, a cellular tower 162 may consist of a steel pole or lattice structure outfitted with antennae for transmitting and receiving signals to and from wireless devices (for example, mobile phone 104, personal digital assistant (PDA) 106, smart phone 106, etc.), other cellular towers, and the MTSO. Each cellular tower 162 may have multiple sets of antenna mounted, depending upon how many different service providers use the tower 162. As should be appreciated, cellular towers 162 may be freestanding towers, or may be mounted on existing structures, such as trees, water tanks, or tall buildings.

The base 164 of each cellular tower 162 may include sets of transmitters and receivers from each service provider having antennae mounted to the tower 162. As a unit, the cellular tower 162 and the base 164 form a system capable of transmitting, receiving, and managing data. This data may consist of, but not be limited to, voice, text, and/or electronic media. As is understood by those skilled in the art, wireless systems typically operate at various frequencies (e.g., across a frequency range from 700 megahertz (MHz) to 1900 MHz), depending upon which wireless technology is utilized. According to the embodiments of the present invention, Intermediary Monitoring Control (IMC) systems may operate across this typical network of wireless systems, and therefore in the same frequency ranges.

Referring still to FIG. 1B, a wireless network may also employ the use of a wireless electronic communication device 104,106 (e.g., mobile phone, personal digital assistant (PDA), smart phone, etc.) capable of sending and receiving voice and data communications in the same frequency range as the wireless communications system. As is understood by those skilled in the art, a mobile device 104,106 comprises, but is not limited to, an internal circuit board, antenna, liquid crystal display (LCD), keyboard, microphone, speaker, and a battery. All of these components and systems making up a mobile communication device 104,106, work together to send, receive, and manage voice and data communications within and beyond the cellular network.

Referring still to FIG. 1B, an MTSO 166 serves as a central control center for the base stations 164 operating in a given area. For example, an MTSO 166 may be configured for controlling wireless communications for a wireless service provider operating in a specified city or other suitable operating area or region. In addition to other operating functions of the MTSO, according to embodiments of the present invention, the MTSO 166 may serve as control point for determining, providing and controlling subscriber features. For example, in accordance with embodiments of this invention, a customer information database 180 may contain data to allow a determination as to whether a particular feature or service is provisioned for a given mobile communication device account. An example of such a feature or service may be Caller ID 182, Call Waiting 184, Voicemail 186, or Automated Escalation System 175. Thus, if an initiating party 132 using mobile communication device 104,106 wishes to invoke automated escalation on mobile device 104,106, a subscriber database 180 may be parsed to determine if the desired features are provisioned on the targeted party's 152 mobile communication device and if the initiating party 132 is authorized to invoke the automated escalation.

As briefly described above, if an initiating party 132 (e.g., business supervisor, parent, guardian, and the like) is authorized to invoke automated escalation on a targeted party 152 (e.g., employee, child, etc.), an Automated Communication Escalation feature 175 may be provisioned at the MTSO 166 on the targeted party's 152 mobile communication device 104,106. When instructions are received at the MTSO 166 for invoking automated escalation to the targeted party's communication device, the automated communication escalation may begin as described herein and continue until the initiating party 132 sends instructions to the MTSO 166 to stop or until a communication is successfully made between the targeted party's communication device 104,106 and the initiating party's communication device.

Example Automated Communication Escalation

According to one example use case, automated communication escalation may include an automated series of escalating communications. For example, a parent (initiating party 132) may call his/her child (targeted party 152) and/or send a text or video message instructing the child to call the parent. The child 152 may not respond to the parent's instructions, wherein the parent 132 may select to send an automated series of escalating communications. A communication may include an SMS message, an MMS message, an instant message, a voice call, a video call a message to a contact or affiliate of a targeted party 152, a social network posting, etc. An SMS message may be automatically sent to the child 152. The message may include an instruction, such as, "Call Home." After a predetermined amount of time, if no communication attempt is made by the child 152 with the parent 132, another SMS message may be automatically sent. After another predetermined amount of time, if no communication attempt is made by the child 152 with the parent 132, an escalated communication may be automatically sent.

According to an embodiment, an escalated communication may be an SMS message, a voice call or a video call to one or more affiliates of a targeted party 152. An affiliate of a targeted party 152 to whom to send a communication may be a manually entered affiliate or contact, or may be determined based on such data as frequency of or last communication between the targeted party 152 and a contact/affiliate, or location and/or presence information. For example, an SMS message may be sent to several friends of the child 152 stating, "Please ask Bob to call mom." According to another embodiment, an escalated communication may be a posting to a social network (e.g., FACEBOOK, MySpace, etc.). According to another embodiment, an escalated communication may be a voice or video call or message to an affiliate of an affiliate of the targeted party 152. For example, a message or voice or video call may be sent to a parent of a friend of child who is not responding to a call or message from a parent. Escalated communications may be sent a predetermined number of times, and/or may be sent at predetermined time intervals. Escalated communications may continue to be sent automatically until the parent 132 cancels the automated communication escalation feature, or until a successful communication is detected between the child 152 and the parent 132.

According to another example use case, automated communication escalation may include control processes that may gradually limit functionality of a targeted party's communication device 152. Limited functionality may include restriction of Internet access, blocked SMS and/or MMS messages, and/or blocked voice and/or video calls. For example, if a targeted party 152 is non-responsive, functionality of the targeted party's communication device may be limited in such a way that any use of the device, other than that of contacting the initiating party 132, may be locked out. Network functionality and/or on-device application functionality may be restricted. A message (e.g., "Call your Parents!") may be provided when a targeted party 152 tries to use his/her device. According to an embodiment, a call may be automatically directed to a pre-selected destination (e.g., initiating party's communication device) without any additional action by the targeted party when any use of the targeted party's 152 communication device is detected.

According to another example use case, a combination of escalating communications and control processes may be provided. For example, a message to a targeted party 152 may be sent via SMS. After a given time interval, if the targeted party 152 has not communicated with the initiating party 132, another message may be sent via SMS, all outbound SMS messages from the targeted party 152 except messages to the initiating party 132 may be blocked or redirected. If the targeted party 152 is still unresponsive after a given time interval, an automated voice call may be sent to the targeted party 132, and all outbound voice calls from the targeted party's communication device may be redirected to the initiating party 132. After another given time interval, if the targeted party 152 is still unresponsive, a message may be posted on the targeted party's social networking site, and all Internet communications from the targeted party's communication device 152 may be blocked and redirected, except the ability to view the posted message. After another given time interval, if the initiating party 132 chooses to proceed with the next step, a message may be sent via SMS to a communication device of one or more associated contacts with the targeted party 132 (e.g., friends, co-workers, and the like) stating, "Please ask the targeted party 132 to contact the initiating party 152." After a given time interval, a message may be sent from an MTSO 166 or the like, asking the initiating party for permission to proceed with a next step of escalation. If permission is granted, automated voice calls may be sent to communication devices of one or more parties associated with the targeted party's associates (e.g., parents of the targeted party's friends) stating, "Please ask the targeted party 152 to contact the initiating party 132." After a time interval, permission may be requested to proceed with a next step of escalation. If permission is granted, messages may be sent via SMS to communication devices of one or more parties associated with the targeted party 152 stating "The targeted party 152 is not responsive, please respond directly to initiating party 132 if the whereabouts of the targeted party 152 are known."

According to an embodiment, an automated initiation feature may be provided. An automated initiation feature may allow an initiating party 132 to remotely turn on a microphone associated with a targeted party's communication device 152 to allow the initiating party to listen to the targeted party's surroundings. According to another embodiment, an automated initiation feature may allow for a call to be automatically initiated from a targeted party's device 152 to an initiating party's device 132 upon detection of communication device usage. According to another embodiment, an audible alert may be provided to inform a targeted party 152 that an initiating party 132 is trying to reach him/her. The audible alert may escalate in frequency and/or volume until a response is detected or until an initiating party 132 cancels the feature.

According to an embodiment, control processes may be provided to allow an initiating party 132 to configure automated communication escalation system 175 to best fit his/her needs. Automated communication escalation system 175 may be implemented with predetermined rule sets, and may be flexible to allow an initiating party 132 to configure the system as needed. An initiating party 132 may manage various features associated with automated communication escalation system 175 via a web interface, a mobile communication device application, or a set-top box application. For example, an initiating party 132 may input preferred affiliates to contact in case of a non-response by a targeted party 152. An initiating party 132 may select a number of escalating messages to send, what kind of escalating messages to send, time intervals between escalating messages, network functionality restrictions, and on-device application functionality restrictions.

Automated communication escalation system 175 rules and logic may be located remotely on a server in a carrier network. Various network elements may be manipulated by the server. A mobile telephone switch 166 or traditional landline switch may access various call functions, a services control point (SCP) may re-direct or block calls, an SMS-C/MMS-C may send/re-direct SMS/MMS messages, a CATV headend application server may integrate automated communication escalation system 175 with set-top boxes, a cellular telephone mobile Internet gateway may control/limit Internet-related functionality, etc. An SMS-C/MMS-C, SCP, phone switch, etc., may be modified with software to enable automated communication escalation system 175 functionality in part or in whole.

Alternatively, automated communication escalation system 175 rules and logic may be implemented as an application located on a communication device 104,106. Communication device functionality may be controlled/limited with network elements being controlled for non-handset functions (e.g., placing notification calls to friends).

According to another embodiment, automated communication escalation system 175 may be implemented as part of a parental control system that may enforce various calling, messaging, and/or Internet restrictions. According to another embodiment, automated communication escalation system 175 may be integrated with child-location-based applications.

Figure 2:
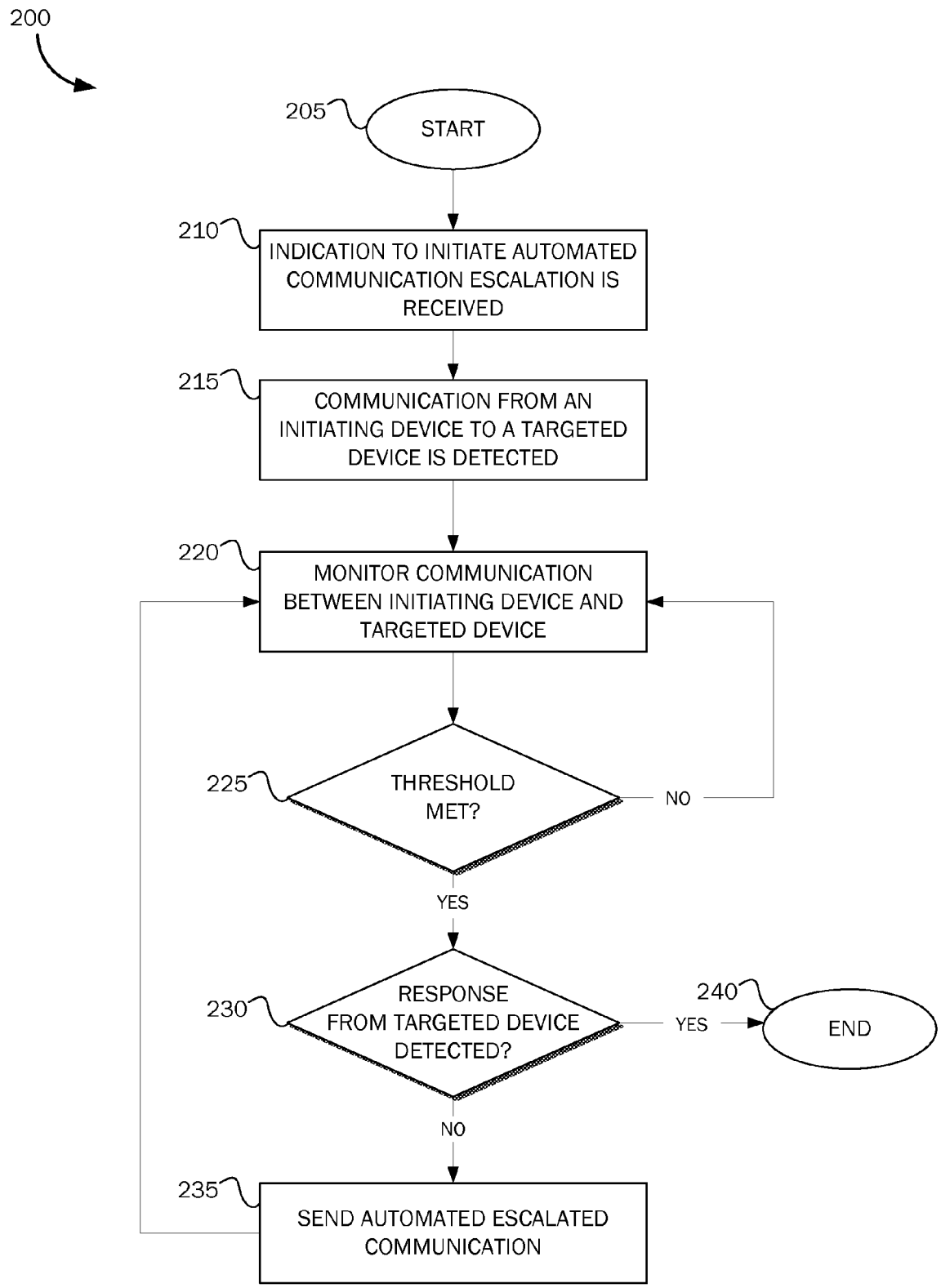
FIG. 2 is a flow diagram showing an illustrative method for providing automated escalated communications to a targeted communication device.

Having described exemplary operating environments 100, 165 with respect to FIGS. 1A and 1B, FIG. 2 is a flow diagram showing an illustrative method 200 for providing automated escalated communications to a targeted party's 152 communication device. Referring now to FIG. 2, the method 200 begins at OPERATION 205 and proceeds to OPERATION 210, where an indication to initiate automated communication escalation system 175 is received. According to an embodiment, an indication to initiate automated communication escalation system 175 may be a result of a manual selection made by an initiating party 132. The selection may be made from an initiating party's communication device 132, or may be made from a remote network-connected computing device. Alternatively, according to another embodiment, automated communication escalation system 175 may be a feature associated with an initiating party's 132 communication device service plan, and may be in an "always-on" mode wherein communication traffic between an initiating party's communication device 132 and a targeted party's communication device 152 may be monitored without a manual selection being made by the initiating party.

The method 200 proceeds to OPERATION 215, where a communication from an initiating device 132 to a targeted device 152 is detected. The communication may be a voice call, a video call, an SMS message, a MMS message, an IM, or any other type of communication from an initiating party's communication device to a targeted party's communication device. The method proceeds to OPERATION 220, where communication traffic between the initiating device 132 and the targeted device 152 is monitored.

According to embodiments, an interface may be provided for allowing an initiating party 132 to define automated communication escalation system 175 settings. For example, an initiating party 132 may select a threshold of a number of communication attempts to be met or a time interval to pass after a communication is sent by the initiating party before an automated escalated communication is sent. A default threshold may be provided if an initiating party 132 does not access automated communication escalation settings. At DECISION OPERATION 225, a determination may be made to determine if a threshold (user-defined or default) has been met. For example, if an initiating party 132 has made a selection for an automated escalated communication to be sent after three communication attempts have been made without a response from a targeted party, and after the initiating party has attempted to reach a targeted party three times, the threshold will have been met. If the threshold has not been met, the method 200 may resume monitoring communication traffic at OPERATION 220. If the threshold has been met, the method 200 continues to DECISION OPERATION 230, where a determination may be made to determine if a communication response from a targeted party's device 152 has been detected. A communication response may include, but is not limited to: a voice call, an SMS message, a MMS message, or an IM. If a response is detected, the method 200 may end at OPERATION 240.

If a response is not detected at OPERATION 230, the method 200 may proceed to OPERATION 235, where an automated escalated communication may be sent to the targeted party's communication device 152. According to embodiments, the automated escalated communication may be a user-defined communication type, or may be a default type of escalated communication. For example, a first automated escalated communication sent to a targeted party 152 may be an SMS message. The SMS message may state that the initiating party 132 is trying to reach the targeted party 152. The SMS message may include a warning that communication device functionality may be restricted if the targeted party 152 does not contact the initiating party 132. According to embodiments, an interface may be provided for an initiating party 132 to select from a list of automated escalated communications to send to a targeted party 152. According to an embodiment, permission from an initiating party 132 may be requested before sending one or more automated escalated communications.

OPERATIONS 220-235 may be repeated, with the automated escalated communication in OPERATION 235 escalating with each subsequent iteration. For example, each subsequent iteration may occur more frequently, may escalate from an SMS message to a voice or video call to a social network posting, etc. OPERATIONS 220-235 may repeat until either a response from the targeted party 152 is detected or until an initiating party 132 manually terminates the process. For example, a child may arrive at home after not answering calls from his/her parent or returning calls to his/her parent. Upon arrival, the parent may manually terminate automated escalated communications to the child's mobile phone. The method 200 ends at OPERATION 240.

Figure 3:
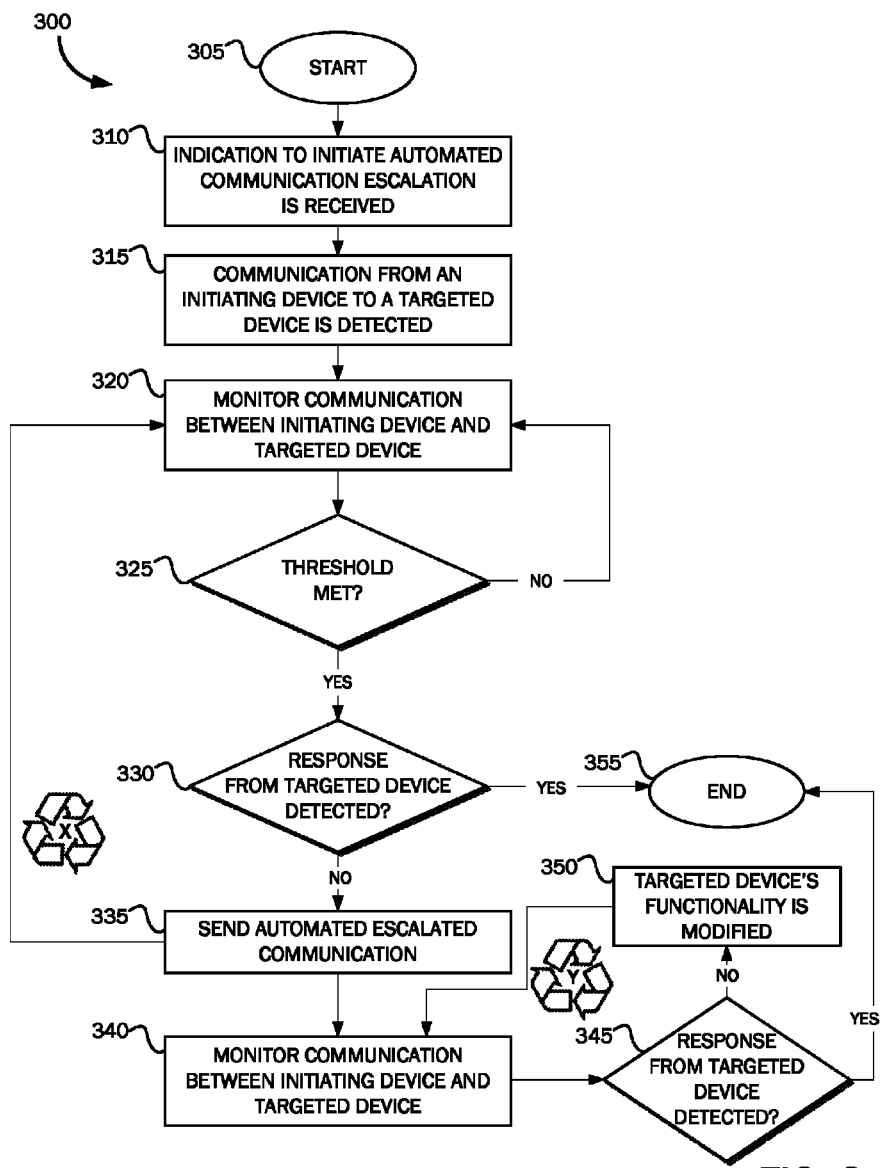
FIG. 3 is a flow diagram showing an illustrative method for providing automated escalated communications to a targeted party's communication device, and for providing automated escalated communication device functionality modification.

Referring now to FIG. 3, a flow diagram of an illustrative method 300 for providing automated escalated communications to a targeted party's 152 communication device, and for providing device functionality modification is shown. The method 300 starts at OPERATION 305, and proceeds to OPERATION 310, where an indication to initiate automated communication escalation system 175 is received. According to an embodiment, an indication to initiate automated communication escalation system 175 may be a result of a manual selection made by an initiating party 132. The selection may be made from an initiating party's communication device 132, or may be made from a remote network-connected computing device. Alternatively, according to another embodiment, automated communication escalation system 175 may be a feature associated with an initiating party's 132 communication device service plan, and may be in an "always-on" mode wherein communication traffic between an initiating party's communication device and a targeted party's communication device 152 may be monitored without a manual selection being made by the initiating party.

The method 300 proceeds to OPERATION 315, where a communication from an initiating device 132 to a targeted device 152 is detected. The communication may be a voice call, a video call, an SMS message, a MMS message, an IM, or any other type of communication from an initiating party's communication device 132 to a targeted party's communication device 152. The method proceeds to OPERATION 320, where communication traffic between the initiating device and the targeted device is monitored.

According to embodiments, an interface may be provided for allowing an initiating party 132 to define automated communication escalation system 175 settings. For example, an initiating party 132 may select a threshold of a number of communication attempts to be met or a time interval to pass after a communication is sent by the initiating party before an automated escalated communication is sent. A default threshold may be provided if an initiating party 132 does not access automated communication escalation settings. At DECISION OPERATION 325, a determination may be made to determine if a threshold (user-defined or default) has been met. For example, if an initiating party 132 has made a selection for an automated escalated communication to be sent after three communication attempts have been made without a response from a targeted party, and after the initiating party has attempted to reach a targeted party three times, the threshold will have been met. If the threshold has not been met, the method 300 may resume monitoring communication traffic at OPERATION 320. If the threshold has been met, the method 300 continues to DECISION OPERATION 330, where a determination may be made to determine if a communication response from a targeted party's device 152 has been detected. A communication response may include, but is not limited to: a voice call, a video call, an SMS message, a MMS message, an IM. If a response is detected, the method 300 may end at OPERATION 355.

If a response is not detected at OPERATION 330, the method 300 may proceed to OPERATION 335, where an automated escalated communication may be sent to the targeted party's communication device 152. According to embodiments, the automated escalated communication may be a user-defined communication type, or may be a default type of escalated communication. For example, a first automated escalated communication sent to a targeted party 152 may be an SMS message. The SMS message may state that the initiating party 132 is trying to reach the targeted party 152. The SMS message may include a warning that communication device functionality may be restricted if the targeted party 152 does not contact the initiating party 132. According to embodiments, an interface may be provided for an initiating party 132 to select from a list of automated escalated communications to send to a targeted party 152.

OPERATIONS 320-335 may be repeated, with the automated escalated communication in OPERATION 335 escalating with each subsequent iteration. For example, each subsequent iteration may occur more frequently, may escalate from an SMS message to a voice or video call to a social network posting, etc. OPERATIONS 320-335 may repeat until either a response from the targeted party 152 is detected, until an initiating party 132 terminates the process, or until a threshold "X" is met. Threshold "X" may be a specified number of sent escalated communications, a specified time interval, or a manual selection by an initiating party 132.

The method 300 may proceed to OPERATION 340, where communication traffic may be monitored between an initiating device 132 and a targeted device 152. At DECISION OPERATION 345, a determination may be made to determine if a communication response from a targeted party's device 152 has been detected. A communication response may include, but is not limited to: a voice call, a video call, an SMS message, a MMS message, an IM. If a response is detected, the method 300 may end at OPERATION 355.

If a response from a targeted device 152 is not detected, the method 300 may proceed to OPERATION 350, where a specified functionality associated with the targeted party's communication device 152 is modified. According to embodiments, a modification of functionality associated with a targeted party's communication device 152 may include, but is not limited to, blocking and/or redirecting SMS, MMS, IM messages, blocking and/or redirecting voice calls, blocking and/or redirecting video calls hotlining voice calls, hotlining video calls, blocking and/or redirecting Internet traffic, and remote microphone control. The modification of functionality may be a user-defined modification, or may be a default functionality modification. For example, a first functionality modification may block and redirect all outbound SMS messages from a targeted communication device 152, except for SMS messages sent to the initiating party 132. According to embodiments, an interface may be provided for an initiating party 132 to select from a list of automated functionality modifications to apply to a targeted communication device 152. Initiating party 132 permission may be requested for one or more functionality modifications.

OPERATIONS 340-350 may be repeated, with the automated functionality modification in OPERATION 350 escalating with each subsequent iteration. For example, each subsequent iteration may occur more frequently, may escalate from blocked and redirected SMS messages to blocked and redirected voice and video calls, to blocked Internet access, to remote microphone control, etc. OPERATIONS 340-350 may repeat until either a response from the targeted party 152 is detected, until an initiating party 132 terminates the process, or until a threshold "Y" is met. Threshold "Y" may be a specified number of automated functionality modifications, a specified time interval, or until an initiating party 132 terminates the process. The method 300 ends at OPERATION 355.

Figure 4:
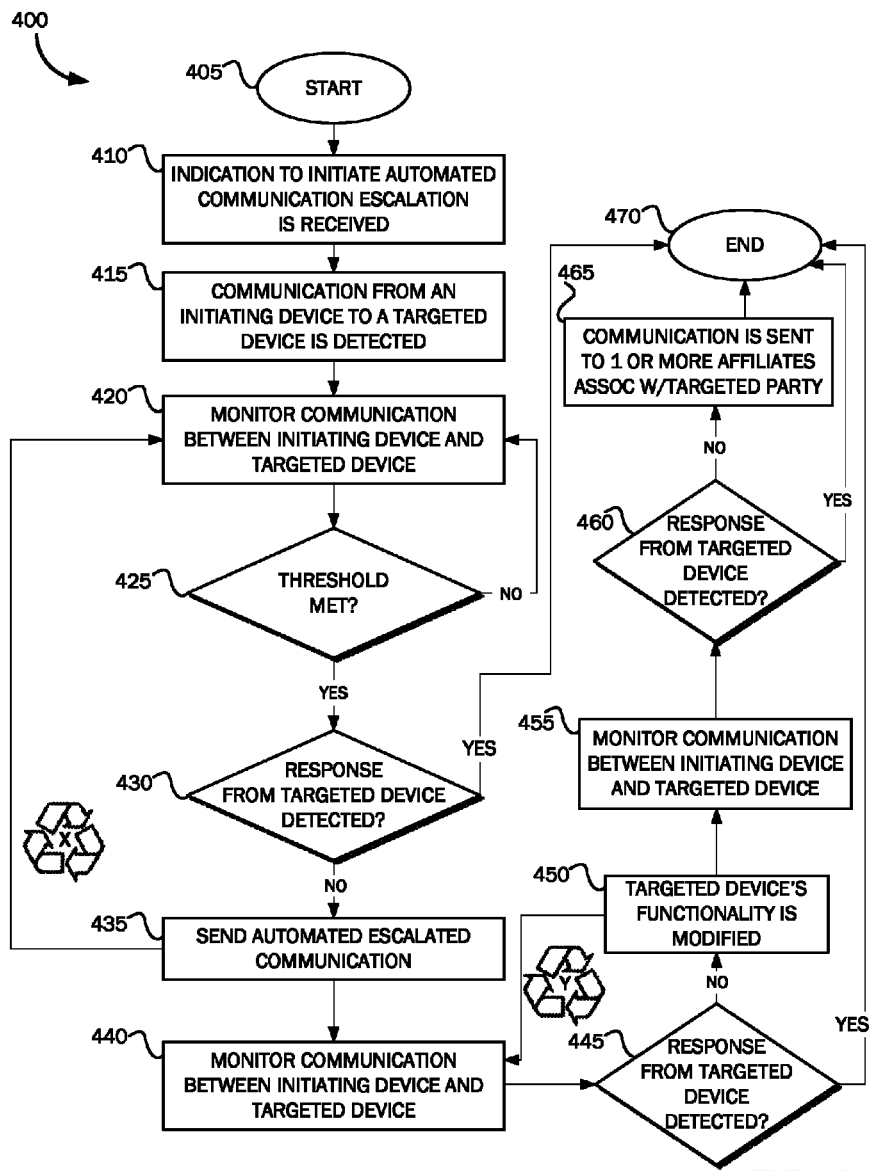
FIG. 4 is a flow diagram showing an illustrative method for providing automated escalated communications to a targeted party's communication device, automated escalated communication device functionality modification, and sending an automated communication to an affiliate associated with the targeted party.

Referring now to FIG. 4, a flow diagram of an illustrative method 400 for providing automated escalated communications to a targeted party's 152 communication device, for providing device functionality modification, and for sending a communication to one or more affiliates associated with the targeted party is shown. The method 400 starts at OPERATION 405, and proceeds to OPERATION 410, where an indication to initiate automated communication escalation system 175 is received. According to an embodiment, an indication to initiate automated communication escalation system 175 may be a result of a manual selection made by an initiating party 132. The selection may be made from an initiating party's communication device 130, or may be made from a remote network-connected computing device. Alternatively, according to another embodiment, automated communication escalation system 175 may be a feature associated with an initiating party's 132 communication device service plan, and may be in an "always-on" mode wherein communication traffic between an initiating party's communication device 132 and a targeted party's communication device 152 may be monitored without a manual selection being made by the initiating party.

The method 400 proceeds to OPERATION 415, where a communication from an initiating device 132 to a targeted device 152 is detected. The communication may be a voice call, a video call, an SMS message, a MMS message, an IM, or any other type of communication from an initiating party's communication device 130 to a targeted party's communication device 152. The method proceeds to OPERATION 420, where communication traffic between the initiating device 132 and the targeted device is monitored.

According to embodiments, an interface may be provided for allowing an initiating party 132 to define automated communication escalation system 175 settings. For example, an initiating party 132 may select a threshold of a number of communication attempts to be met or a time interval to pass after a communication is sent by the initiating party before an automated escalated communication is sent. A default threshold may be provided if an initiating party 132 does not access automated communication escalation settings. At DECISION OPERATION 425, a determination may be made to determine if a threshold (user-defined or default) has been met. For example, if an initiating party 132 has made a selection for an automated escalated communication to be sent after three communication attempts have been made without a response from a targeted party, and after the initiating party has attempted to reach a targeted party three times, the threshold will have been met. If the threshold has not been met, the method 400 may resume monitoring communication traffic at OPERATION 420. If the threshold has been met, the method 400 continues to DECISION OPERATION 430, where a determination may be made to determine if a communication response from a targeted party's device 152 has been detected. A communication response may include, but is not limited to: a voice call, a video call, an SMS message, a MMS message, an IM. If a response is detected, the method 400 may end at OPERATION 470.

If a response is not detected at DECISION OPERATION 430, the method 400 may proceed to OPERATION 435, where an automated escalated communication may be sent to the targeted party's communication device 152. According to embodiments, the automated escalated communication may be a user-defined communication type, or may be a default type of escalated communication. For example, a first automated escalated communication sent to a targeted party 152 may be an SMS message. The SMS message may state that the initiating party 132 is trying to reach the targeted party 152. The SMS message may include a warning that communication device functionality may be restricted if the targeted party 152 does not contact the initiating party 132. According to embodiments, an interface may be provided for an initiating party 132 to select from a list of automated escalated communications to send to a targeted party 152.

OPERATIONS 420-435 may be repeated, with the automated escalated communication in OPERATION 435 escalating with each subsequent iteration. For example, each subsequent iteration may occur more frequently, may escalate from an SMS message to a voice or video call to a social network posting, etc. OPERATIONS 420-435 may repeat until either a response from the targeted party 152 is detected, until an initiating party 132 terminates the process, or until a threshold "X" is met. Threshold "X" may be a specified number of sent escalated communications, a specified time interval, or a manual selection by an initiating party 132.

The method 400 may proceed to OPERATION 440, where communication traffic may be monitored between an initiating device 132 and a targeted device 152. At DECISION OPERATION 445, a determination may be made to determine if a communication response from a targeted party's device 152 has been detected. A communication response may include, but is not limited to: a voice call, a video call, an SMS message, a MMS message, an IM. If a response is detected, the method 400 may end at OPERATION 470.

If a response from a targeted device 152 is not detected, the method 400 may proceed to OPERATION 450, where a specified functionality associated with the targeted party's communication device 152 is modified. According to embodiments, a modification of functionality associated with a targeted party's communication device 152 may include, but is not limited to, blocking and/or redirecting SMS, MMS, IM messages, blocking and/or redirecting voice calls, blocking and/or redirecting video calls, hotlining voice calls, hotlining video calls, blocking and/or redirecting Internet traffic, and remote microphone control. The modification of functionality may be a user-defined modification, or may be a default functionality modification. For example, a first functionality modification may block and redirect all outbound SMS messages from a targeted communication device 152, except for SMS messages sent to the initiating party 132. According to embodiments, an interface may be provided for an initiating party 132 to select from a list of automated functionality modifications to apply to a targeted communication device 152. Initiating party 132 permission may be requested for one or more functionality modifications.

OPERATIONS 440-450 may be repeated, with the automated functionality modification in OPERATION 450 escalating with each subsequent iteration. For example, each subsequent iteration may occur more frequently, may escalate from blocked and redirected SMS messages to blocked and redirected voice and video calls, to blocked Internet access, to remote microphone control, etc. OPERATIONS 440-450 may repeat until either a response from the targeted party 152 is detected, until an initiating party 132 terminates the process, or until a threshold "Y" is met. Threshold "Y" may be a specified number of automated functionality modifications, a specified time interval, or a manual selection by an initiating party 132.

The method 400 may proceed to OPERATION 455, where communication traffic may be monitored between an initiating device 132 and a targeted device 152. At DECISION OPERATION 460, a determination may be made to determine if a communication response from a targeted party's device 152 has been detected. A communication response may include, but is not limited to: a voice call, a video call, an SMS message, a MMS message, or an IM. If a response is detected, the method 400 may end at OPERATION 470.

If a response from a targeted device 152 is not detected, the method 400 may proceed to OPERATION 465, where a communication may be sent to one or more affiliates associated with a targeted party 152. As was described previously, an affiliate of a targeted party 152 to whom to send a communication may be a manually entered affiliate or contact, or may be determined based on such data as frequency of or last communication between the targeted party 152 and a contact/affiliate, or location and/or presence information. A communication may include, but is not limited to, an SMS, MMS, or IM message, a voice call, a video call, or other type of communication. For example, an SMS message may be sent to one or several friends of a targeted party 152 stating, "Please ask Bob to call mom." According to an embodiment, location and/or presence information may be used to determine affiliates who may be near a targeted party 152 or in contact with the targeted party. Location information may be provided based on GPS information, network-based location technologies, or wireless positioning systems, for example, WIFI-based systems. Presence information may be based on information provided by a presence server 145. The method 400 ends at OPERATION 470. As should be appreciated, although the method 400 is illustrated and described in order of sending escalated communications, then limiting device functionality, then contacting associates of the targeted party 152, the operations may occur in an alternative order. For example, the method 400 may be executed wherein escalated communications are sent, then associates of the targeted party are contacted, then functionality of the targeted party's communication device is limited.

Referring back to FIG. 1B, the initiating party's device 132 is illustrated as a wireless communication device, such as a cellular telephone 104, wireless personal digital assistant 106, smart phone, and the like. As should be appreciated, the initiating party's device may include other devices, such as wired telephones 108, wireless or wired computers 102 or any other suitable communications device to which a communication may be routed by the MTSO 166 to the targeted party's communication device 152. That is, an initiating party 132 may utilize a variety of computing devices which may contain an application for providing automation communication escalation between an initiating party 132 and a targeted party 152, such as any web-based application and run on the initiating party's personal computer or other networked computing device.

Figure 5:
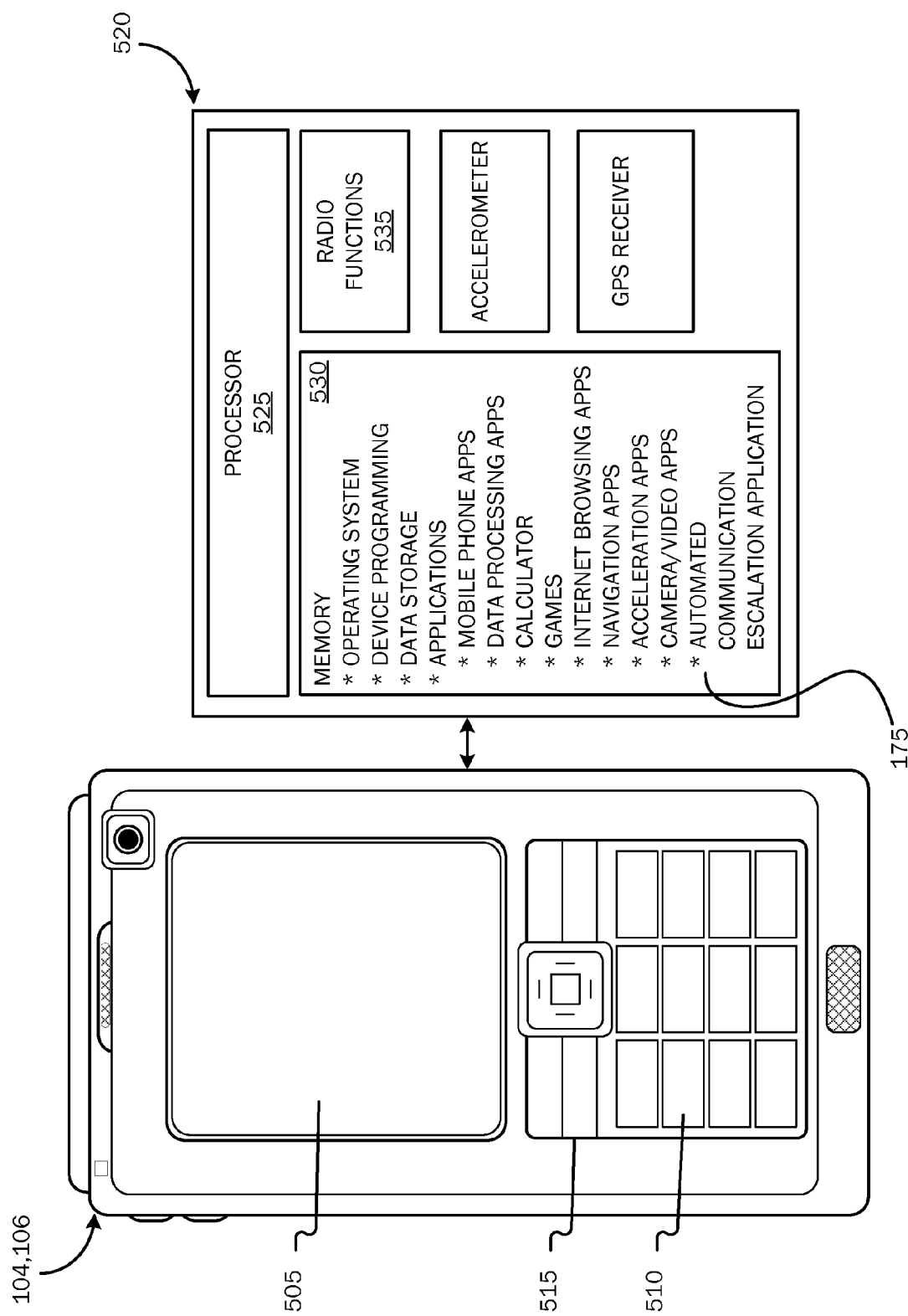
FIG. 5 is a simplified block diagram illustrating a communication device with which embodiments of the present invention may be incorporated.

Referring now to FIG. 5, a block diagram of a mobile telephone/computing device 104,106 with which embodiments for which the present invention may be practiced is illustrated. The mobile computing device 104,106 is illustrative of any suitable device, such as a mobile telephone, personal digital assistant (PDA), or handheld computer, operative to send, receive and process wireless communications according to embodiments of the present invention. A display screen 505 is operative for displaying a variety of information such as information about incoming and outgoing communications, as well as, a variety of data and displayable objects, for example, text, alphanumeric data, photographs, videos, and the like.

Data input to the device 104,106 may be performed via a variety of suitable means, such as, a touch screen input via the display screen 505, keyboard or keypad input via a data entry area 515, key input via one or more selectable buttons or controls 510, voice input via a microphone disposed on the device 104,106, photographic input via a camera functionality associated with the mobile computing device, or any other suitable input means. Data may be output via the device 104,106 via any suitable output means, including but not limited to, display on the display screen 505, audible output via an associated speaker or connected earphone system, tactile output via a vibration module, and the like.

Operational unit 520 is illustrative of internal operating functionality of the mobile computing device 104,106. A processor 525 is illustrative of a general-purpose computer processor for processing incoming and outgoing data and communications and controlling operation of the device and associated software applications via a mobile computing device operating system. Memory 530 may be utilized for storing a device operating system, device programming, one or more stored applications, for example, an automated communication escalation application 175, mobile telephone applications, data processing applications, calculators, games, Internet browsing applications, navigation applications, etc. Radio functions 535 include all required functionality, including onboard antennae, for allowing the device 104,106 to communicate with other communication devices and systems via a wireless network.

Figure 6:
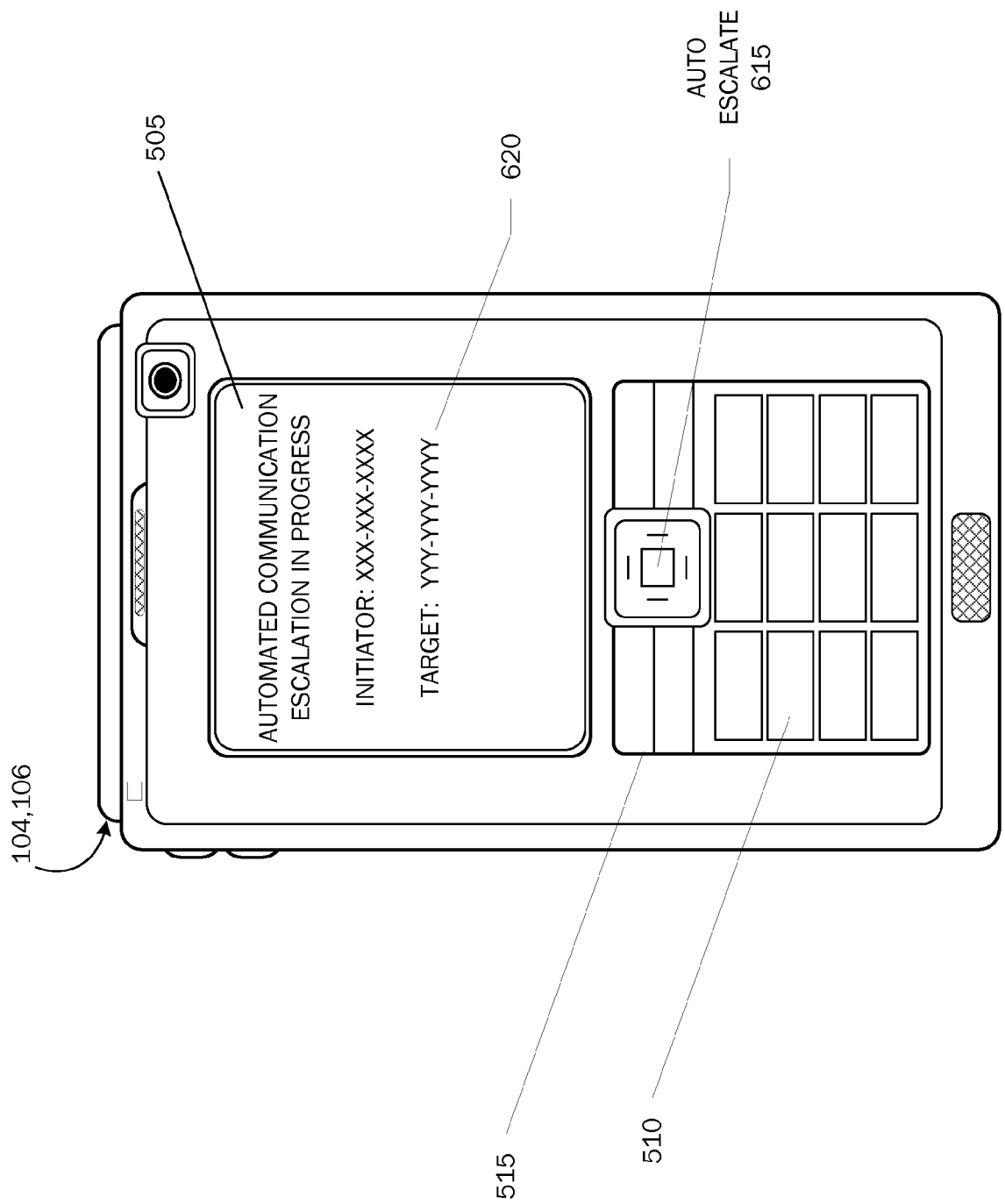
FIG. 6 is a simplified block diagram illustrating a wireless communication device interface and screenshot utilizing embodiments of the present invention.

Having described elements of a system architecture for a mobile telephone/computing device 104,106 that may serve as an exemplary operating environment for embodiments of the present invention, FIG. 6 is a simplified block diagram illustrating a mobile telephone device user interface with which embodiments of the present invention may be practiced.

Referring now to FIG. 6, a wireless communication device 104,106 user interface may include a general message area. For example, the general message area may display a message 620 on the initiating party's mobile communication device 104,106 (or other suitable communication device) when automated communication escalation is commissioned to a targeted party's wireless communication device (e.g., a child of the initiating party). According to embodiments of the present invention, the automated communication escalation application may be displayed on an LCD touch-screen 505 with pre-programmed pushbuttons or an LCD screen, which is not a touch-screen, but which may be activated using a device keypad 515, each of which may provide options for controlling a communication between a initiating party 132 and a targeted party 152. For example, the general message area may display the message 620 "Automated Escalation in Progress" between initiating party XXX-XXX-XXXX and targeted party YYY-YYY-YYYY. Or it may display a status of communication between the two parties such as "Message Was Sent." A communication may be a voice call, a video call, an SMS message, an MMS message, an e-mail message, or any other communication that may be sent or received utilizing a mobile device 104,106. The term "communication" may be used to describe any one of various forms of communications to or from a mobile communication device. As another embodiment for initiating the automated escalation process between two parties, one or more selectable buttons on device keypad 515 may be used. As an example, selectable button 615 may be dedicated for selecting the automated communication escalation process as shown in FIG. 6. As should be appreciated the communication disposition options illustrated in FIG. 6 are for purposes of example and are not limiting of other options that may be available according to embodiments of the invention.

Although described in combination with a mobile telephone/computing device 104,106 and a MTSO 166, in alternative embodiments, the invention may be used in combination with any number of computer systems, such as in desktop environments, laptop or notebook computer systems, multi-processor systems, micro-processor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

As described herein, allowing a user of a communication device to send automated escalated communications is provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method for providing automated escalated communications, the method comprising:
    detecting a communication sent from an initiating party's communication device intended for a targeted party's communication device;
    monitoring communication traffic between the initiating party's communication device and the targeted party's communication device;
    determining if a communication has been sent from the targeted party's communication device to the initiating party's communication device;
    if a communication sent from the targeted party's communication device to the initiating party's communication device is not detected, sending a first escalated communication to the targeted party's communication device;
    monitoring communication traffic between the initiating party's communication device and the targeted party's communication device;
    determining if a communication has been sent from the targeted party's communication device to the initiating party's communication device;
    if a communication sent from the targeted party's communication device to the initiating party's communication device is not detected, automatically sending a second escalated communication to the targeted party's communication device;
    continuing to automatically send additional escalated communications to the targeted party's communication device until a communication sent from the targeted party's communication device to the initiating party's communication device is detected, or until a indication of a selection made by the initiating party to cease automated escalated communications is received; and
    automatically modifying a functionality of the targeted party's communication device if a communication sent from the targeted party's communication device to the initiating party's communication device is not detected within a given time interval.

2. The method of claim 1, wherein detecting a communication sent from an initiating party's communication device intended for a targeted party's communication device includes a short messaging service (SMS) message, a multimedia messaging service (MMS) message, an instant message (IM), a voice call, or a video call.

3. The method of claim 1, further comprising while monitoring communication traffic between the initiating party's communication device and the targeted party's communication device, determining if a given time interval has elapsed since detecting a communication sent from an initiating party's communication device intended for a targeted party's communication device or determining if a given number of communications sent from an initiating party's communication device intended for a targeted party's communication device have been detected.

4. The method of claim 1, wherein sending a first escalated communication includes sending a short messaging service (SMS) message, a multimedia messaging service (MMS) message, an instant message (IM), a social networking posting, a voice call, a video call, or an audible alert.

5. The method of claim 1, wherein sending a second escalated communication includes sending one or more short messaging service (SMS) messages, multimedia messaging service (MMS) messages, instant messages (IM), social networking postings, voice calls, video calls, or audible alerts.

6. The method of claim 5, wherein sending a second escalated communication includes sending a communication after a prescribed time interval, increasing a volume of an audible alert, or sending a more intrusive escalated communication than sent with a previous escalated communication.

7. The method of claim 1, wherein automatically modifying a functionality of the targeted party's communication device if a communication sent from the targeted party's communication device to the initiating party's communication device is not detected within a given time interval includes not detecting a communication within a given time interval or after a given number of automated escalated communication attempts or after a given number of functionality modifications.

8. The method of claim 7, wherein automatically modifying a functionality of the targeted party's communication device includes one or more of blocking and redirecting a short messaging service (SMS) message, one or more of blocking and redirecting a multimedia messaging service (MMS) message, one or more of blocking and redirecting an instant message (IM), one or more of blocking and redirecting a voice call, one or more of blocking and redirecting a video call, hotlining a voice call, hotlining a video call, one or more of blocking and redirecting Internet traffic, or remotely controlling the targeted party's communication device's microphone so that audio may be remotely monitored.

9. The method of claim 7, further comprising continuing modifying a functionality of the targeted party's communication device after a given time interval has elapsed until a communication sent from the targeted party's communication device to the initiating party's communication device is detected, or until an indication of a selection made by the initiating party to cease functionality modification is received.

10. The method of claim 1, further comprising automatically sending a communication to one or more affiliates associated with the targeted party if a communication sent from the targeted party's communication device to the initiating party's communication device is not detected within a given time interval.

11. The method of claim 10, wherein sending a communication to one or more affiliates associated with the targeted party includes sending a short messaging service (SMS) message, a multimedia messaging service (MMS) message, an instant message (IM), a social networking posting, a voice call, or a video call.

12. The method of claim 10, wherein sending a communication to one or more affiliates associated with the targeted party includes sending a communication to one or more contacts from the targeted party's contacts list, sending a communication to one or more contacts who are in proximity to the targeted party, sending a communication to one or more contacts who have been in recent contact with the targeted party, or sending a communication to a targeted party's contact's affiliate.

13. The method of claim 12, wherein sending a communication to one or more contacts who are in proximity to the targeted party includes determining a location of the targeted party and the one or more contacts via a location determining method.

14. The method of claim 10, wherein automatically sending a communication to one or more affiliates associated with the targeted party if a communication sent from the targeted party's communication device to the initiating party's communication device is not detected within a given time interval includes not detecting a communication within a given time interval or after a given number of automated escalated communication attempts.

15. A computer-readable storage medium which stores a set of instructions which when executed performs a method for providing automated escalated communications, the method executed by the set of instructions comprising:
  detecting a communication sent from an initiating party's communication device intended for a targeted party's communication device;
  monitoring communication traffic between the initiating party's communication device and the targeted party's communication device;
  determining if a threshold has been met;
  determining if a communication has been sent from the targeted party's communication device to the initiating party's communication device;
  if a communication sent from the targeted party's communication device to the initiating party's communication device is not detected, sending a first communication to the targeted party's communication device;
  monitoring communication traffic between the initiating party's communication device and the targeted party's communication device;
  determining if a threshold has been met;
  determining if a communication has been sent from the targeted party's communication device to the initiating party's communication device;
  if a communication sent from the targeted party's communication device to the initiating party's communication device is not detected, automatically sending an escalated communication to the targeted party's communication device;
  continuing to automatically send additional escalated communications to the targeted party's communication device until a communication sent from the targeted party's communication device to the initiating party's communication device is detected, or until a indication of a selection made by the initiating party to cease automated escalated communications is received; and
  automatically modifying a functionality of the targeted party's communication device if a communication sent from the targeted party's communication device to the initiating party's communication device is not detected within a given threshold.

16. The computer readable storage medium of claim 15, wherein automatically modifying a functionality of the targeted party's communication device includes blocking and/or redirecting a short messaging service (SMS) message, blocking and/or redirecting a multimedia messaging service (MMS) message, blocking and/or redirecting an instant message (IM), blocking and/or redirecting a voice call, blocking and/or redirecting a video call, hotlining a voice call, hotlining a video call, blocking and/or redirecting Internet traffic, or remotely controlling the targeted party's communication device's microphone.

17. The computer readable storage medium of claim 15, further comprising automatically sending a communication to one or more affiliates associated with the targeted party if a communication sent from the targeted party's communication device to the initiating party's communication device is not detected within a given threshold.

18. The computer readable storage medium of claim 17, wherein sending a communication to one or more affiliates associated with the targeted party includes sending a communication to one or more contacts from the targeted party's contacts list, sending a communication to one or more contacts who are in proximity to the targeted party, sending a communication to one or more contacts who have been in recent contact with the targeted party, or sending a communication to a targeted party's contact's parent.

19. A system for providing automated escalated communications, the system comprising:
   a memory storage;
   a processing unit coupled to the memory storage, wherein the processing unit is operative to:
      detect a communication sent from an initiating party's communication device intended for a targeted party's communication device;
      monitor communication traffic between the initiating party's communication device and the targeted party's communication device;
      determine if a threshold has been met;
      determine if a communication has been sent from the targeted party's communication device to the initiating party's communication device;
      send a first communication if a communication sent from the targeted party's communication device to the initiating party's communication device is not detected;
      monitor communication traffic between the initiating party's communication device and the targeted party's communication device;
      determine if a threshold has been met;
      determine if a communication has been sent from the targeted party's communication device to the initiating party's communication device;
      automatically send an escalated communication if a communication sent from the targeted party's communication device to the initiating party's communication device is not detected;
      continue to automatically send escalated communications until a communication sent from the targeted party's communication device to the initiating party's communication device is detected, or until a indication of a selection made by the initiating party to cease automated escalated communications is received;
      automatically modify a functionality of the targeted party's communication device if a communication sent from the targeted party's communication device to the initiating party's communication device is not detected within a given threshold; and
      automatically send a communication to one or more affiliates associated with the targeted party if a communication sent from the targeted party's communication device to the initiating party's communication device is not detected within a given threshold.

20. The system of claim 18, wherein automatically modifying a functionality of the targeted party's communication device if a communication sent from the targeted party's communication device to the initiating party's communication device is not detected within a given time interval includes not detecting a communication within a given time interval or after a given number of automated escalated communication attempts or after a given number of functionality modifications.

21. The method of claim 20, wherein automatically modifying a functionality of the targeted party's communication device includes one or more of blocking and redirecting a short messaging service (SMS) message, one or more of blocking and redirecting a multimedia messaging service (MMS) message, one or more of blocking and redirecting an instant message (IM), one or more of blocking and redirecting a voice call, one or more of blocking and redirecting a video call, hotlining a voice call, hotlining a video call, one or more of blocking and redirecting Internet traffic, or remotely controlling the targeted party's communication device's microphone so that audio may be remotely monitored.

* * * * *

UNITED STATES PATENT AND TRADEMARK OFFICE
CERTIFICATE OF CORRECTION

| | | |
|---|---|---|
| PATENT NO. | : 8,477,914 B1 | Page 1 of 1 |
| APPLICATION NO. | : 13/081807 | |
| DATED | : July 2, 2013 | |
| INVENTOR(S) | : Clement et al. | |

It is certified that error appears in the above-identified patent and that said Letters Patent is hereby corrected as shown below:

In the Claims

Col. 20, line 15, claim 20: "claim 18," should read --claim 19,--

Signed and Sealed this
First Day of April, 2014

Michelle K. Lee
*Deputy Director of the United States Patent and Trademark Office*